United States Patent [19]

Merriman

[11] 3,952,688

[45] Apr. 27, 1976

[54] ACCELERATOR MOVEMENT INDICATOR

[76] Inventor: Henry H. Merriman, 751 W. Washington Ave., Jackson, Mich. 49203

[22] Filed: May 16, 1974

[21] Appl. No.: 470,418

[52] U.S. Cl. .......................... 116/28 R; 116/67 R; 116/114 AH; 116/139
[51] Int. Cl.² ........................................... B60Q 5/00
[58] Field of Search ........... 116/114 AH, 67 R, 139, 116/1, 28 R; 74/513, 514; 180/105, 108

[56] References Cited
UNITED STATES PATENTS

| 677,113 | 6/1901 | Bruce | 46/178 |
|---|---|---|---|
| 2,825,418 | 3/1958 | Kershman | 116/28 R |
| 2,966,328 | 12/1960 | Burnworth | 74/513 |
| 3,774,572 | 11/1973 | Borraccio | 116/139 |

FOREIGN PATENTS OR APPLICATIONS

| 27,176 | 12/1907 | United Kingdom | 116/139 |

Primary Examiner—S. Clement Swisher
Assistant Examiner—Denis E. Corr
Attorney, Agent, or Firm—Beaman & Beaman

[57] ABSTRACT

A device for attaching to the underside of an internal combustion engine accelerator which is compressed during depressing of the accelerator. A rate of accelerator depression faster than that efficiently necessary causes the device to emit an audible signal indicating excessively rapid accelerator movement such as causes the wasting of gasoline. The device comprises an expansible chamber motor in the form of a bellows having a reed type sound producing element actuated by air forced from the bellows during accelerator depression.

10 Claims, 5 Drawing Figures

U.S. Patent   April 27, 1976   3,952,688
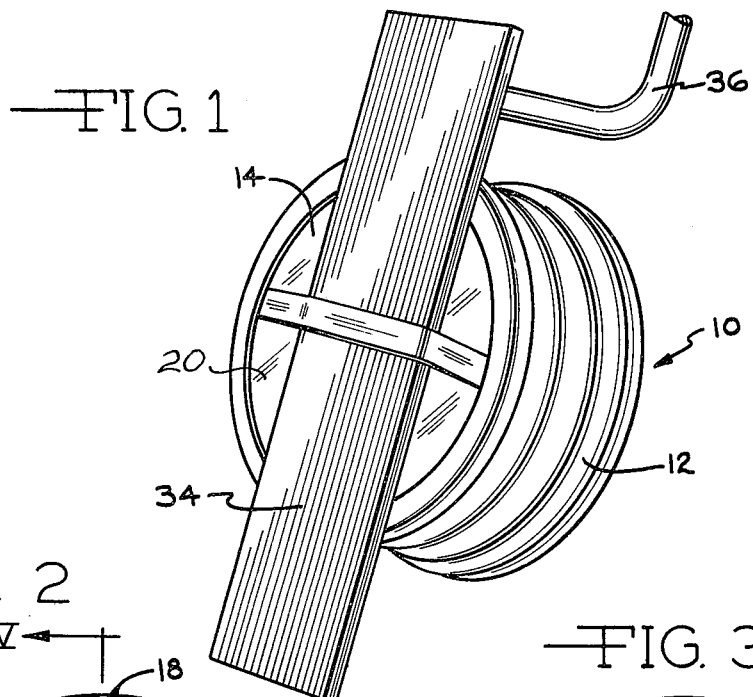
FIG. 1
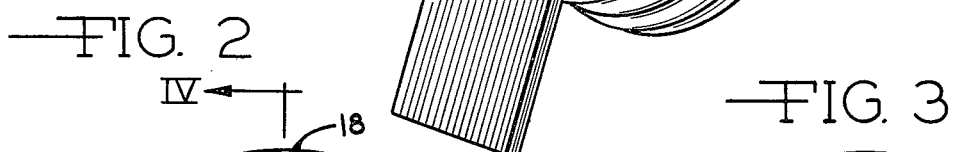
FIG. 2
FIG. 3
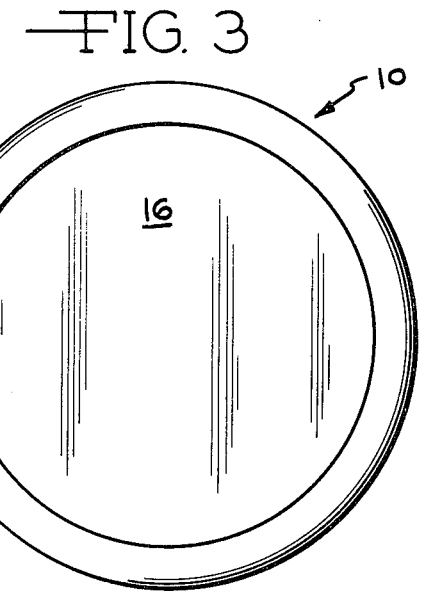
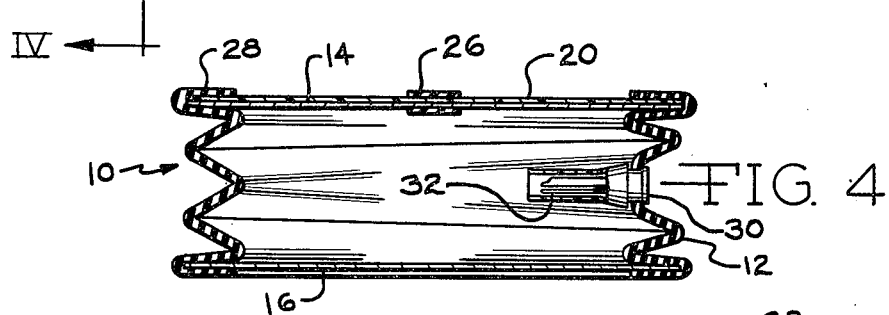
FIG. 4
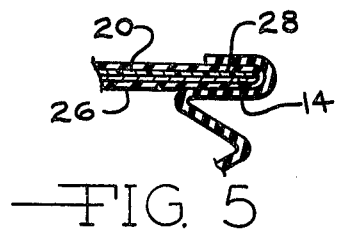
FIG. 5

ACCELERATOR MOVEMENT INDICATOR

BACKGROUND OF THE INVENTION

The invention pertains to the field of gasoline saving devices for internal combustion engines wherein a signal is produced if the engine accelerator pedal is depressed at an excessive rate.

It has long been recognized that the operating characteristics of an internal combustion engine, particularly an automobile engine, can be improved if the rate of acceleration of the engine is commensurate with the ability of the engine to accelerate. However, with a manually operated accelerator pedal, usually a foot pedal, there is a tendency for many drivers to depress the accelerator, and open the throttle valve, at a rate greater than the rate which the engine actually accelerates and is capable of using fuel. This discrepancy between the rate of accelerator throttle operation, and the ability of the engine to accommodate the call for acceleration, causes an excessively rich fuel mixture to be introduced into the engine, wasting gasoline, producing unburned gasoline with the engine cylinders, and often causing a dilution of the motor oil. Such a rich fuel mixture also produces highly undesirable and contaminating engine pollution and in view of the present shortage of gasoline, and emphasis on clean air, the over rich fuel mixture is most objectionable.

A number of complicated throttle control devices are known wherein "over-acceleration" is prevented by controlling the rate of movement of the accelerator pedal and linkages, or relating the acceleration to the intake manifold pressure, as, in one such device as disclosed in the applicant's expired U.S. Pat. No. 2,157,652.

While known throttle control devices, and intake manifold pressure regulated apparatus, are effective to minimize the wasting of gasoline, such devices are expensive, and often objectionable from the driver's point of view in that they adversely affect the "feel" highly desirable to the operator with respect to the operation of the vehicle and tend to "override" the driver's control.

SUMMARY OF THE INVENTION

It is an object of the invention to provide an inexpensive, simple, readily installable device which indicates an excessive rate of internal combustion engine accelerator pedal movement whereby the wasting of gas and inefficient driving habits attendant therewith due to accelerator pedal movement is immediately indicated to the operator in an audible manner.

A further object of the invention is to provide a gasoline saving device for use with a motor vehicle which is dependable in operation, may be readily used and understood by the unskilled, and produces an audible signal when an excessive rate of accelerator pedal operation occurs.

An additional object of the invention is to provide an economical internal combustion engine accelerator movement indicator which is capable of being adjusted to accommodate various engines and accelerator movements to produce the most effective sensing characteristics for a particular vehicle.

In the practice of the invention an expansible chamber motor in the form of a bellows having closed ends is attached to the underside of the vehicle accelerator foot pedal. As the foot pedal is depressed the expansible chamber is compressed forcing the air therefrom. At least a portion of the expelled air passes through a reed device, and if the velocity of the air passing through the reed device is sufficient, an audible signal is produced to indicate to the driver that the rate of accelerator depression is excessive.

Vents are preferably provided whereby air may escape from the bellows during accelerator depression, as well as pass through the reed device. An adjustable valve member is used to selectively close the vents as desired, thereby permitting regulation of the amount of air passing through the reed device for a particular engine and accelerator combination. By positioning the valve the device may be "customized" with respect to each vehicle and operator.

An elastomer band is used to affix the device to the underside of an accelerator pedal, and the means of attachment is universal as to readily permit the device to be attached to practically all accelerators without requiring special skills. The device does not interfere with the normal operation of the accelerator pedal, and permits the intended extent of movement without hampering or affecting the "feel" of the accelerator pedal movement. The accelerator may be quickly fully depressed in order to provide maximum acceleration for safety purposes, and the signaling of the apparatus can be ignored, if desired, as the audible signal produced serves only as a reminder, and does not impose an undesired or uncontrolled operation upon the vehicle operation or its throttle linkage.

BRIEF DESCRIPTION OF THE DRAWINGS

The aforementioned objects of the invention, and the operation thereof, are described in the following specification, and the invention is illustrated in the following drawings wherein:

FIG. 1 is a perspective view of an accelerator movement indicator constructed in accord with the invention as mounted upon an accelerator pedal, FIG. 2 is a top, elevational view of the indicator with the valve disk in a half open position, FIG. 3 is a bottom view of the indicator, FIG. 4 is an elevational, sectional view as taken through section IV—IV of FIG. 2, and FIG. 5 is an enlarged, detail, elevational view along section V—V of FIG. 2.

DESCRIPTION OF THE PREFERRED EMBODIMENT

The accelerator movement indicator in accord with the invention basically comprises an expansible chamber motor in the form of a bellows 10. The bellows includes an annular, flexible, sinuous wall 12 formed of an elastomer, such as rubber, neoprene, vinyl, etc. Preferably, the elastomer material of the wall 12 is of such a character as to have a biasing action when the wall is longitudinally compressed tending to restore the wall to its original axial length after the compressive forces have been released.

The ends of the bellows are closed by a pair of rigid head plates, which may be formed of metal as illustrated, or could be of a synthetic plastic material. The head 14 constitutes the upper head, while the head 16 forms the bottom or lower head. The heads are each of an annular configuration, and are of such a diameter as to permit the last corrugation at each end of the wall 12 to fit about the periphery of the associated head to form a sealed relationship therewith.

The upper head 14 is provided with a plurality of air vent holes 18, FIG. 2, four being illustrated in the disclosed embodiment. A valve disk or plate 20, preferably formed of a synthetic plastic material which is transparent or translucent, directly engages the outer surface of the head 14, and the valve disk is provided with a valve opening 22, and a similar finger receiving opening 24 in diametrical relationsip to opening 22. The diameter of the valve opening 22 is sufficient to selectively permit all four vents 18 to be in alignment therewith permitting maximum venting of the bellows to the atmosphere. By rotating the valve disk, 20 upon the head 14, by placing one's fingers in the openings 22 and 24, one, two, three, four or no air vents may selectively communicate with the atmosphere, and in this manner the degree of venting of the bellows may be regulated. In FIG. 2 the venting through two air vents is illustrated in solid lines and the dotted lines show the venting of four vents.

Prior to assemblying the upper head plate 14 and the valve disk 20 to the upper end of the bellows wall 12 an annular elastomer band 26 is stretched over the head and disk in a diametrical manner, as will be appreciated from FIGS. 2, 4 and 5. The three assembled components are then located within the uppermost corrugation of the bellows, and the bellows is slightly stretched to snugly embrace the head, while the bellow's wall portion 28 will overlap the head, and engage the disk and maintain the disk in firm relationship to the head, yet permit the disk to be selectively rotated with respect to the head. As will be appreciated from the drawings, the upper segment of the band 26 is exteriorly accessible.

The lower head 16 is assembled to the lower portion of the wall 12 in a manner similar to that employed with head 14, i.e., the wall is slightly stretched to receive the periphery of the head within the lowermost corrugation.

An audible sound producing device, constituting a reed whistle or "tweeter" 30 is located within the bellow's wall communicating with the bellow's chamber and the atmosphere. The reed device 30 includes a vibratable reed 32, and is one of the well known type wherein the passage of a sufficient amount of air at a given velocity from the bellows to the atmosphere causes the reed to vibrate and produce an audible signal.

The accelerator movement indicator is assembled to a conventional automobile accelerator pedal 34 in a manner shown in FIG. 1. The accelerator pedal 34 is connected to the usual throttle linkage 36, and may be pivotally mounted to the passenger compartment floor board at the lower end of the pedal, or the pedal may be pivotally connected to the fire wall by the linkage 36. With either type of accelerator construction the locating of the indicator on the underside of the pedal may be easily accomplished by pulling the accessible elastomer band portion away from the head 14 and slipping the bellows under the accelerator pedal so that the band portion passes across the upper surface of the pedal. If the throttle linkage 36 has been temporarily disconnected from the pedal 34 it should then be reconnected.

The operator utilizes the accelerator foot pedal in the normal fashion, depressing the pedal to produce engine acceleration. Depressing the accelerator pedal 34 causes the bellows 10 to be compressed and the air within the bellows is exhausted to atmosphere through the reed device 30, and the air vents 18 not covered by the valve disk 20.

If the operator depresses the accelerator pedal at an excessive rate which would waste gasoline the flow of air through the reed device 30 will be of such velocity as to cause the reed to vibrate producing an audible signal. This signal will remind the operator that the accelerator pedal is being depressed too rapidly and remind the operator to use a more gentle and uniform pressure in order to prevent an excessive rate of accelerator depression. As the accelerator pedal is released or "backed off" the biasing forces inherent within the material of wall 12 will restore the bellows to the maximum volume capacity. If desired a compression spring could be located with the bellows between heads 14 and 16 to augment the restoration of the bellow's shape.

By adjusting the valve disk 20 with respect to the air vents 18 the amount of air flowing through the reed device 30 during the bellow's compression can be regulated. The more air vents uncovered by the opening 22, the less the amount of air flowing through the reed device and the greater the rate of compression of the bellows permitted before the audible signal is produced. Conversely, by rotating the valve disk 20 to cover all of the air vents, air escapes from the bellows only through the reed device producing a very sensitive operation. Thus, it will be appreciated by varying the position of the valve disk, the degree of sensitivity of the accelerator movement indicator may be accurately varied, to produce that operation most desirable for a particular size and type of automobile engine, and also in accordance with the driver's preference.

Use of the indicator in accord with the invention soon develops good driving habits producing the most efficient use of gasoline and highest engine performance, and the simplicity of operation, economics of manufacture and ease of installation make the indicator in accord with the invention practical in every respect.

It is appreciated that various modifications to the disclosed embodiment may be apparent to those skilled in the art without departing from the scope of the invention.

I claim:

1. An accelerator foot pedal movement indicator for vehicle internal combustion engine foot pedal accelerators comprising, in combination, a vibratable reed for producing a signal discernable by the vehicle operator, a compressible bellows operatively associated with said reed responsive to depression of the accelerator foot pedal for activating said reed upon depression of the foot pedal at and above a predetermined rate of movement, and third means for attaching said bellows to the foot pedal for operation thereby during foot pedal depression, said bellows being operative to actuate said reed upon the foot pedal being depressed at said predetermined rate of movement.

2. In an accelerator foot pedal movement indicator as in claim 1 wherein said third means comprises an elongated element mounted upon said bellows and engaging the foot pedal.

3. In combination, a depressible vehicle internal combustion engine accelerator foot pedal having an upper foot engaging surface and an undersurface disposed toward the vehicle floor, a movement sensing signal producing member operable to produce a signal discernable by the vehicle operator upon said member sensing movement at a rate above a predetermined velocity, and attachment means defined on said member directly attaching said member to said foot pedal for movement therewith whereby said member is operated and moved directly by the foot pedal sensing the movement thereof, said movement sensing signal producing member comprising a compressible bellows having a vibratable reed in communication therewith, said reed producing an audible signal upon said bellows being compressed at a predetermined rate, said attachment means attaching said bellows to said foot pedal undersurface for compression between said foot pedal and the vehicle floor.

4. An accelerator movement indicator for accelerators of internal combustion vehicle engines for audibly indicating an excessive rate of accelerator depression comprising, in combination, an expansible chamber member capable of being compressed from an expanded condition to a compressed condition by a depression of the accelerator, audible sound producing means communicating with said expansible chamber member producing sound upon air flowing therethrough at a predetermined rate during compression of said member, at least one air vent defined in said chamber member, adjustable valve means mounted on said chamber selectively opening and closing said air vent to vary the amount of air flowing through said sound producing means during compression of said chamber member, and accelerator attachment means mounted on said member for attaching said member to the accelerator of an internal combustion engine.

5. In an accelerator movement indicator as in claim 4 wherein said sound producing means comprises a vibratable reed.

6. In an accelerator movement indicator as in claim 4 wherein said expansible chamber member comprises a bellows.

7. In an accelerator movement indicator as in claim 6 wherein said bellows includes an annular flexible wall having ends, and a head element sealing each end of said wall.

8. In an accelerator movement indicator as in claim 7 wherein said attachment means is mounted upon one of said heads.

9. In an accelerator movement indicator as in claim 8 wherein said attachment means comprises an elastic element adapted to engage an accelerator pedal whereby the accelerator pedal is located between said elastic element and the element associated head.

10. In an accelerator movement indicator as in claim 4 wherein said expansible chamber member comprises a flexible bellows having flexible walls and planar, rigid heads, a plurality of air vents defined in one of said heads, and said valve means comprising a plate member engaging said one head adapted to be selectively positioned over selected vents.

* * * * *